Patented Jan. 9, 1945

2,366,731

UNITED STATES PATENT OFFICE 2,366,731

ALKYLATION OF ISOPARAFFINS

Vladimir N. Ipatieff and Carl B. Linn, Riverside, Ill., assignors to Universal Oil Products Company, Chicago, Ill., a corporation of Delaware No Drawing. Application December 26, 1942, Serial No. 470,222

11 Claims. (Cl. 260—683.4)

The present invention relates to the interaction of saturated hydrocarbons, particularly isoparaffinic or other branched chain alkylatable hydrocarbons, with olefinic hydrocarbons in the presence of a novel alkylation catalyst. It is more particularly concerned with the production of substantially saturated gasoline boiling range hydrocarbons having high antiknock values by the alkylation of isoparaffins with normally gaseous mono-olefins.

Numerous liquid catalysts have been proposed for the alkylation of isoparaffinic hydrocarbons with olefinic hydrocarbons, for example, sulfuric acid, phosphoric acid, hydrogen fluoride, etc. However, in most instances, these catalysts are not capable of effecting satisfactorily the reaction between isoparaffins and ethylene. Although some of the prior art alkylation catalysts are useful when propylene is employed as the olefinic reactant, certain disadvantages are inherent in many cases such as rapid deterioration of the catalyst in the case of sulfuric acid.

In one specific embodiment the present invention comprises a process for the alkylation of isoparaffins with ethylene in the presence of a catalyst consisting essentially of boron trifluoride and fluorosulfonic acid.

Whereas alkylation catalysts such as sulfuric acid or hydrogen fluoride are effective in alkylating isobutane with higher and more reactive mono-olefins such as amylenes, butylenes, and to a certain extent, propylene, these catalysts are not commercially feasible in the alkylation of isobutane with ethylene. Sulfuric acid is particularly impractical since even under severe operating conditions most of the ethylene reacts to form ethyl sulfuric acid or diethyl sulfate. However, we have found that a composite of boron trifluoride and fluorosulfonic acid will readily effect alkylation of isoparaffins with ethylene.

The alkylation of isoparaffins, particularly isobutane, with olefinic hydrocarbons is an important step in the production of saturated motor fuels for aviation purposes. Isobutane is readily available from cracking plant gases, natural gases, and from various hydrocarbon conversion process. Isobutane and ethylene may be reacted to form valuable hexanes, particularly 2,3-dimethyl butane along with smaller amounts of other hexanes such as 2,2-dimethylbutane or neohexane. However, the higher homologs of isobutane such as isopentane, isohexane, etc. are equally useful in the production of higher molecular weight isoparaffins according to the present invention. Although the boron trifluoride-fluorosulfonic acid catalyst is particularly applicable when ethylene is employed as the alkylating agent, our invention is broader in scope and the catalyst may be used generally for reacting saturated hydrocarbons including naphthenes and isoparaffinic or other branched chain hydrocarbons containing at least one tertiary carbon atom with either normally gaseous or normally liquid olefinic hydrocarbons, particularly mono olefins containing from 2 to about 12 carbon atoms per molecule. The term "isoparaffin" as used throughout this specification is intended to include all alkylatable paraffinic hydrocarbons.

Olefinic hydrocarbons which may be employed as alkylating agents within the broad scope of the present invention may be either normally gaseous or normally liquid as hereinbefore described, and in certain instances polymers of the lower boiling olefins may also be employed although not necessarily under the same operating conditions. For example, when olefinic polymers are reacted with isoparaffins, it is generally desirable to employ a somewhat higher molal ratio of isoparaffin to olefin than would be used when monomeric olefinic reactants are employed. It is also possible to employ mixtures of normally gaseous and normally liquid reactants or hydrocarbon fractions which contain appreciable amounts of normal paraffins or naphthenes.

Although fluorsulfonic acid alone is an effective catalyst for the alkylation of isoparaffinic hydrocarbons with most olefinic hydrocarbons, it is not efficient under ordinary operating conditions in the case of alkylation with ethylene. It should also be noted that boron trifluoride alone is not an alkylation catalyst, but if hydrogen fluoride is present in addition to the boron trifluoride, satisfactory alkylation may be obtained.

The alkylation of naphthenic or isoparaffinic hydrocarbons with olefinic hydrocarbons in the presence of the boron trifluoride-fluorosulfonic catalyst may be carried out at a temperature of from about 0° C. to about 100° C. although a more preferable operating range is from about 10° C. to about 50° C. In any event the temperature of the reaction should be higher than the freezing point of the catalyst. It is highly desirable that the reaction be carried out under sufficient pressure to maintain a substantial portion of the reactants in the liquid phase, for example, from about 10 to about 100 atmospheres, dependent upon the amount of boron trifluoride present, the temperature of the reaction, and upon other factors. As is well-known in the art of alkylating isoparaffins with olefins, the hydrocarbon feed to the alkylation reaction zone should contain a substantial excess of isoparaffinic hydrocarbons over olefinic hydrocarbons, for example, a molal ratio of isoparaffins to olefins of from about 3:1 to about 15:1 or higher. If desired, the olefinic reactants may be introduced at spaced points throughout the alkylation zone in order to maintain the desired high isoparaffin to olefin ratio. It is also preferable that the water content of the catalyst be kept to a minimum, usually below 5% by weight. Thus, it is desirable to subject the hydrocarbon charging stock to a drying step prior to introduction into the alkylation step.

Fluorosulfonic acid is a liquid at ordinary atmospheric temperatures and pressures. It has a faint pungent odor, it feels greasy to the touch, and in contrast to the intense blistering action of hydrogen fluoride it has but little action on the dry skin. The acid boils at 163° C. with slight decomposition. Fluorosulfonic acid may be prepared readily by reacting fuming sulfuric acid with fluorspar or by interacting concentrated sulfuric acid with anhydrous hydrogen fluoride. Boron trifluoride is a colorless gas at atmospheric pressure and ordinary temperatures having a boiling point of —101° C.

The composite alkylation catalyst of this invention may be utilized in a variety of ways although the most convenient method is to dissolve substantial amounts of the boron trifluoride in fluorosulfonic acid. The alkylation process may be conducted in batch or continuous operation but from a commercial point of view the latter is preferable. The hydrocarbon reactants and catalyst are subjected to intimate contact preferably by means of a mechanically agitated alkylation zone which is maintained under sufficient pressure to keep a substantial portion of the reactants and catalyst in the liquid phase. Other types of contacting equipment may also be employed, for example, a so-called "time tank" wherein intimate contact is obtained by means of a system of baffles or orifices. Cooling means such as internal heat exchange zones must also be incorporated in the reaction zone in order to control the temperature of the exothermic alkylation reaction.

The hydrocarbon-catalyst mixture is withdrawn from the reaction zone and introduced into a gravity settling zone or other suitable separation zone. An upper hydrocarbon reaction products layer is withdrawn to a fractionation system while the lower used catalyst layer is preferably recycled to the alkylation zone although a portion thereof may be withdrawn and replaced with fresh catalyst. In certain cases, the withdrawn used catalyst may be regenerated and returned to the system. The hydrocarbon reaction products are fractionated to separate desired alkylation products from unconverted isoparaffins. The latter are recycled to the alkylation zone in order to maintain the desired high isoparaffin to olefin ratio in the hydrocarbon feed stock. Light hydrocarbon contaminants in the charging stock to the process may also be removed in the fractionation step in order to prevent their accumulation in the alkylation system. For example, if appreciable amounts of ethane, propane, or normal butane are introduced with the fresh hydrocarbon feed, it will be desirable to remove these constituents during the fractionation operation.

In certain cases it may be desirable to agitate isoparaffins with fluorosulfonic acid in substantially the liquid phase and then introduce boron trifluoride and olefinic reactants at spaced points throughout the reaction zone. Other modifications and methods of effecting contact between the isoparaffinic and olefinic reactants and the two components of the catalyst will be readily apparent to those skilled in the hydrocarbon conversion art. It is not intended to limit the generally broad scope of the present invention to any particular method of contacting the catalyst and the reactants.

The following experimental data are introduced to illustrate the nature of the present invention as it is applied to the alkylation of isobutane with ethylene. The experiments were conducted in a nickel-lined stirring autoclave. In each case the fluorosulfonic acid and isobutane were charged to the autoclave which was then sealed. Boron trifluoride was added under pressure and stirring was begun. Throughout the course of the reaction ethylene was added under a pressure of about 800 pounds per square inch gauge. At the end of each run the pressure on the autoclave was released through a "train" containing an alkali scrubber, a calcium chloride drying tower, and receivers cooled to —80° C. After the unreacted ethylene and isobutane were thus released, the autoclave was opened and the product analyzed. The following table contains the pertinent experimental data.

|  | Run No. | | | |
| --- | --- | --- | --- | --- |
|  | 1 | 2 | 3 | 4 |
| Contact time, hrs.[1] | 4 | 4 | 12 | 20 |
| Temperature, °C | 30 | 30 | 30 | 30 |
| Pressure, lbs. per sq. in. gage | 800 | 800 | 800 | 800 |
| Charge, gms.: | | | | |
| HFSO₃ | 0 | 97 | 93 | 26 |
| BF₃ | 50 | 0 | 82 | 26 |
| Isobutane | 200 | 228 | 228 | 228 |
| Ethylene | (²) | (²) | (²) | (²) |
| Recovered, gms.: | | | | |
| Condensable gas | ³ 200 | ³ 228 | 26 | 185 |
| Liquid product | | | | |
| Upper layer | | 0 | 507 | 115 |
| Lower layer | | 93 | 220 | 35 |
| Analysis of condensable gas, mol per cent: | | | | |
| C₂ | | | 1.0 | |
| C₂H₄ | | | | 2.4 |
| C₃H₆ | | | 38.0 | |
| C₄H₁₀ | | | 57.0 | 95.7 |
| C₄H₈ | | | 0.7 | |
| C₅ | | | } 3.3 | 1.9 |
| C₆ | | | | |
| Distillation of upper layer, vol. per cent: | | | | |
| 20–50° C | | | 2 | 2 |
| 50–75° C | | | 20 | 12 |
| 75–100° C | | | 5 | 5 |
| 100–150° C | | | 25 | 16 |
| 150–200° C | | | 17 | 12 |
| 200° C | | | 31 | 53 |

[1] Total time of stirring while contacting reactants.
[2] Not weighed.
[3] Substantially butane.

Run No. 1, shows that boron trifluoride alone will not produce interaction between isobutane and ethylene. The isobutane was recovered substantially unchanged although a considerable portion of the ethylene was converted to a heavy polymer.

In Run No. 2 isobutane and ethylene were contacted with fluorosulfonic acid alone and here again no alkylation occurred. Isobutane was recovered unchanged and the liquid found in the autoclave at the end of the run had a density greater than 1.0 indicating that it probably consisted of the ethyl ester of fluorosulfonic acid.

Runs No. 3 and No. 4 were made using the boron trifluoride-fluorosulfonic acid catalyst of the present invention. In Run No. 3 using relatively large amounts of the catalyst, the absorption of ethylene was rapid and during the course of the experiment the autoclave was completely filled with liquid. This hydrocarbon product was saturated and contained appreciable amounts of hexanes. In Run No. 4 a smaller amount of boron trifluoride and fluorosulfonic acid was employed but the character of the product obtained was substantially the same as in Run No. 3.

The novelty and utility of this invention are evident from the preceding specification and examples although neither section is intended to place undue limitations on the generally broad scope of the invention.

We claim as our invention:

1. A process for the synthesis of hydrocarbons which comprises reacting an alkylatable saturated hydrocarbon with an olefinic hydrocarbon under alkylating conditions in the presence of boron trifluoride and fluorosulfonic acid.

2. A process for the alkylation of isoparaffinic hydrocarbons with olefinic hydrocarbons which comprises contacting isoparaffins and olefins at a temperature of from about 0° C. to about 100° C. in the presence of boron trifluoride and fluorosulfonic acid.

3. A process for the production of substantially saturated motor fuel which comprises reacting an isoparaffin with an olefin under alkylating conditions in the presence of boron trifluoride and fluorosulfonic acid.

4. A process for the synthesis of hydrocarbons which comprises alkylating an isoparaffin with an olefin in the presence of boron trifluoride and fluorosulfonic acid at a temperature of from about 10° C. to about 50° C. under sufficient pressure to maintain the reactants in substantially the liquid phase.

5. A process for the synthesis of hydrocarbons which comprises alkylating isobutane with ethylene in the presence of boron trifluoride and fluorosulfonic acid.

6. A process for the synthesis of hydrocarbons which comprises alkylating isobutane with propylene in the presence of boron trifluoride and fluorosulfonic acid.

7. A process for the synthesis of hydrocarbons which comprises alkylating isobutane with butylene in the presence of boron trifluoride and fluorosulfonic acid.

8. A process for the production of hexanes which comprises reacting isobutane with ethylene at a temperature of from about 10° C. to about 50° C. under a pressure sufficient to maintain a substantial portion of the reactants in the liquid phase in the presence of boron trifluoride and fluorosulfonic acid.

9. A process for the production of 2,3-dimethylbutane which comprises alkaylating isobutane with ethylene in the presence of boron trifluoride and fluorosulfonic acid at a temperature of from about 10° C. to about 50° C. under a pressure sufficient to maintain a substantial portion of the reactants in the liquid phase and while maintaining a substantial molar excess of isoparaffin over olefin in the hydrocarbon feed to the alkylation zone.

10. A process for the synthesis of branched chain hydrocarbons which comprises reacting an isoparaffin with an olefin under alkylating conditions in the presence of a catalyst consisting essentially of a solution of boron trifluoride in fluorosulfonic acid.

11. A process for the synthesis of branched chain hydrocarbons which comprises reacting an isoparaffinic hydrocarbon with an olefinic hydrocarbon in a reaction zone maintained under alkylating conditions and in the presence of an alkylating catalyst consisting essentially of boron trifluoride and fluorosulfonic acid, separating hydrocarbon reaction products from used alkylating catalyst, and recycling at least a portion of said used catalyst to the reaction zone.

VLADIMIR N. IPATIEFF.
CARL B. LINN.